(12) United States Patent
Davis

(10) Patent No.: US 8,343,118 B2
(45) Date of Patent: Jan. 1, 2013

(54) DIAPER RASH PREVENTION APPARATUS

(75) Inventor: Joseph Eugene Davis, Morgan Hill, CA (US)

(73) Assignee: Joseph Eugene Davis, Morgan Hill, CA (US)

( * ) Notice: Subject to any disclaimer, the term of this patent is extended or adjusted under 35 U.S.C. 154(b) by 465 days.

(21) Appl. No.: 11/384,145

(22) Filed: Mar. 16, 2006

(65) Prior Publication Data

US 2007/0215593 A1   Sep. 20, 2007

(51) Int. Cl.
*A61M 1/00* (2006.01)

(52) U.S. Cl. ........ 604/317; 604/358; 604/361; 604/367; 604/385.23; 604/386; 604/387; 604/365; 604/374; 604/375; 604/384; 604/385.21; 604/381; 27/19; 27/21.1; 27/1; 27/35; 5/484; 5/487

(58) Field of Classification Search .......... 604/317, 604/358, 361
See application file for complete search history.

(56) References Cited

U.S. PATENT DOCUMENTS

| | | | | |
|---|---|---|---|---|
| 2,277,043 | A | * | 3/1942 | Cohn ............................ 604/348 |
| 3,055,368 | A | * | 9/1962 | Baxter .......................... 604/344 |
| 3,451,063 | A | * | 6/1969 | Dwork .............................. 2/402 |
| 3,577,989 | A |   | 5/1971 | Anderson ...................... 128/283 |
| 3,731,685 | A | * | 5/1973 | Eidus ............................ 604/361 |
| 3,804,093 | A |   | 4/1974 | Fell ............................... 128/286 |
| 3,817,217 | A |   | 6/1974 | Matuka et al. .................. 119/95 |
| 3,837,342 | A |   | 9/1974 | Mitsuo ........................... 128/283 |
| 3,938,521 | A |   | 2/1976 | Ritota et al. .................... 128/283 |
| 4,013,077 | A |   | 3/1977 | Ritota et al. .................... 128/295 |
| 4,368,733 | A |   | 1/1983 | Sanidas ......................... 128/283 |
| 4,406,657 | A |   | 9/1983 | Curutcharry ................... 604/328 |
| 4,444,152 | A |   | 4/1984 | Berardo .......................... 119/95 |
| 4,445,898 | A |   | 5/1984 | Jensen ........................... 604/337 |
| 4,510,887 | A |   | 4/1985 | Lincoln et al. .................. 119/95 |
| 4,784,656 | A |   | 11/1988 | Christian ....................... 604/355 |
| D302,307 | S |   | 7/1989 | Steer |
| 4,850,986 | A |   | 7/1989 | Temple .......................... 604/355 |
| 4,904,256 | A |   | 2/1990 | Yamaguchi ..................... 623/14 |

(Continued)

FOREIGN PATENT DOCUMENTS

CN     1251980 A     5/1973

(Continued)

OTHER PUBLICATIONS

International Search Report and Written Opinion from PCT Application No. PCT/US07/63496 mailed on Jan. 8, 2009.
International Preliminary Report on Patentability from PCT Application No. PCT/US07/63496 mailed on Feb. 19, 2009.

(Continued)

*Primary Examiner* — Tatyana Zalukaeva
*Assistant Examiner* — Ilya Y Treyger
(74) *Attorney, Agent, or Firm* — Joshua D. Isenberg; JDI Patent

(57) ABSTRACT

An apparatus is provided that includes an enclosure with an aperture which is adapted for being placed in communication with an anus for the purpose of directing fecal matter into the enclosure. In one embodiment, the enclosure may include a polyethylene material with a thickness of less than 50 microns. In another embodiment, the enclosure may include an air hole formed therein for remaining open to allow air to escape therefrom upon the receipt of the fecal matter into the enclosure. In still yet another embodiment, the aperture may be circular and the enclosure may include a flexibility sufficient to allow the enclosure to be placed on an intended wearer in any orientation about an axis defined by the aperture.

24 Claims, 6 Drawing Sheets

U.S. PATENT DOCUMENTS

| | | | |
|---|---|---|---|
| 4,908,247 A | 3/1990 | Baird | |
| 4,946,720 A | 8/1990 | Oishi et al. | 428/35.4 |
| 4,990,147 A | 2/1991 | Freeland | 604/385.2 |
| 5,045,052 A | 9/1991 | Sans | 600/32 |
| 5,062,840 A | 11/1991 | Holt et al. | 604/385.1 |
| 5,158,810 A | 10/1992 | Oishi et al. | 428/35.4 |
| 5,185,009 A | 2/1993 | Sitnam | |
| 5,188,623 A | 2/1993 | Kok et al. | 604/328 |
| 5,190,533 A | 3/1993 | Blackburn | |
| 5,209,744 A | 5/1993 | Abe et al. | 604/342 |
| 5,300,358 A | 4/1994 | Evers | |
| 5,312,384 A | 5/1994 | Temple | 604/355 |
| 5,353,805 A | 10/1994 | Mojena | 128/761 |
| 5,372,594 A | 12/1994 | Colacello et al. | 604/333 |
| D354,809 S | 1/1995 | Eskey | |
| 5,421,827 A | 6/1995 | Temple | 604/355 |
| 5,542,940 A | 8/1996 | Jonker | |
| 5,658,266 A | 8/1997 | Colacello et al. | 604/333 |
| 5,658,267 A | 8/1997 | Colacello et al. | 604/333 |
| 5,667,502 A | 9/1997 | Holtermann | 604/342 |
| 5,683,372 A | 11/1997 | Colacello et al. | 604/333 |
| 5,728,080 A | 3/1998 | Suyama | 604/333 |
| 5,771,590 A | 6/1998 | Colacello et al. | 30/360 |
| 5,783,504 A | 7/1998 | Ehret | |
| 5,836,629 A * | 11/1998 | Hobart | 294/1.3 |
| 5,968,023 A | 10/1999 | Olsen | |
| 6,039,370 A | 3/2000 | Doley, Jr. et al. | 294/1.5 |
| 6,050,983 A | 4/2000 | Moore et al. | 604/333 |
| 6,096,057 A | 8/2000 | Klingenstein | 606/197 |
| 6,135,986 A | 10/2000 | Leisner et al. | |
| 6,248,098 B1 * | 6/2001 | Sayama | 604/385.28 |
| 6,350,256 B1 | 2/2002 | Palumbo et al. | 604/339 |
| 6,375,643 B1 | 4/2002 | Moorehead et al. | 604/322 |
| 6,398,768 B1 | 6/2002 | Palumbo et al. | 604/355 |
| 6,623,465 B1 | 9/2003 | Roe | |
| 6,685,687 B2 | 2/2004 | Mishima et al. | 604/385.19 |
| 6,837,187 B2 | 1/2005 | Berardo | 119/792 |
| 6,840,925 B2 | 1/2005 | Mishima et al. | 604/385.01 |
| 6,926,701 B2 | 8/2005 | Burns, Jr. et al. | 604/344 |
| 6,951,552 B2 | 10/2005 | D'Acchioli et al. | 604/319 |
| 7,087,042 B2 * | 8/2006 | Montgomery | 604/342 |
| 7,101,357 B2 | 9/2006 | Tanaka | |
| 2002/0082570 A1 | 6/2002 | Mishima et al. | 604/322 |
| 2002/0138058 A1 | 9/2002 | Mishima et al. | 604/385.19 |
| 2003/0050614 A1 | 3/2003 | D'Acchioli et al. | 604/346 |
| 2003/0150050 A1 | 8/2003 | Tanaka et al. | 4/144.3 |
| 2003/0208170 A1 | 11/2003 | D'Acchioli et al. | 604/355 |
| 2004/0002687 A1 | 1/2004 | Burns, Jr. et al. | 604/355 |
| 2004/0144334 A1 | 7/2004 | Berardo | 119/868 |
| 2005/0261674 A1 | 11/2005 | Nobis et al. | 606/45 |

FOREIGN PATENT DOCUMENTS

| | | | |
|---|---|---|---|
| CN | 2105264 U | | 5/1992 |
| CN | 1170345 A | | 1/1998 |
| EP | 0887061 | * | 6/1967 |
| EP | 0319071 A2 | | 11/1988 |
| EP | 0366802 B1 | | 3/1989 |
| EP | 0474173 A1 | | 9/1991 |
| EP | 0319071 B1 | | 2/1993 |
| EP | 0366802 B1 | | 1/1995 |
| EP | 0474173 B1 | | 4/1996 |
| EP | 0709076 A1 | | 5/1996 |
| EP | 0 887 061 A1 | * | 12/1998 |
| EP | 0887061 | * | 12/1998 |
| EP | 0887061 A1 | | 12/1998 |
| EP | 0887061 A1 | * | 12/1998 |
| EP | 0887063 A1 | | 12/1998 |
| EP | 0719209 B1 | | 1/2000 |
| EP | 0719210 B1 | | 1/2000 |
| EP | 1136048 A1 | | 9/2001 |
| EP | 1136049 A1 | | 9/2001 |
| EP | 0991390 B1 | | 1/2002 |
| EP | 1243237 A3 | | 3/2002 |
| EP | 1219270 A1 | | 7/2002 |
| EP | 1243237 A2 | | 9/2002 |
| EP | 0993292 B1 | | 3/2003 |
| EP | 0993293 B1 | | 4/2003 |
| EP | 0991388 B1 | | 1/2004 |
| EP | 1243237 B1 | | 3/2005 |
| EP | 1570731 A1 | | 9/2005 |
| EP | 1517657 B1 | | 12/2005 |
| GB | 2 152 387 | | 8/1985 |
| JP | 2002-507909 | | 3/2002 |
| JP | 2003-038563 | | 2/2003 |
| JP | 2003-522597 | | 7/2003 |
| JP | 2005-516732 | | 6/2005 |
| WO | WO 90/13274 | * | 11/1990 |
| WO | WO 95/03015 | | 2/1995 |
| WO | WO 98/33458 | | 8/1998 |
| WO | WO 99/00084 | | 1/1999 |
| WO | WO 99/00085 | | 1/1999 |
| WO | WO 99/00086 | | 1/1999 |
| WO | WO 99/00087 | | 1/1999 |
| WO | WO 99/00090 | | 1/1999 |
| WO | WO 99/00091 | | 1/1999 |
| WO | WO 99/00092 | | 1/1999 |
| WO | WO 00/00128 | | 1/2000 |
| WO | WO0160301 | | 8/2001 |
| WO | WO 01/70156 | | 9/2001 |
| WO | WO 01/70157 | | 9/2001 |
| WO | WO 03/068065 | | 8/2003 |
| WO | WO 03/068116 | | 8/2003 |
| WO | WO 03/082147 | | 10/2003 |
| WO | WO 2004/002378 | | 1/2004 |
| WO | WO 2004/010911 | | 2/2004 |

OTHER PUBLICATIONS

English traslation of Chinese Office Action dated Jan. 22, 2010 issued for Chinese patent application No. 2007800090218, entitled "Diaper Rash Prevention Apparatus" to Joseph E. Davis.

Chinese Office Action dated Aug. 10, 2010 issued for Chinese patent application No. 200780009021.8, entitled "Diaper Rash Prevention Apparatus" to Joseph E Davis.

Office Action dated Nov. 9, 2010 issued by Patent Office of the Russian Federation for Russian Patent Application No. 2008138670/14(049866), "Diaper Rash Prevention Apparatus".

Communication from Chinese Patent Attorney dated Mar. 3, 2011 regarding claim 2 of Chinese patent application 200780009021.8 (corresponding to original claim 6 of the present application) and proposed claim amendment.

Office Action dated May 18, 2011 for Mexican Patent Application No. MX/a/2008/011568.

English language summary of Office Action dated May 18, 2011 for Mexican Patent Application No. MX/a/2008/011568.

Exhibit A, Biodegradable Plastic, en.wikipedia.org/wiki/Biodegradable_Plastic, page last modified Jan. 27, 2012, pp. 1-7 of Exhibits.

Exhibit B, Colostomy Bag, http://medical-dictionary.thefreedictionary.com/colostomy+bag, printed from internet on Jan. 30, 2012, pp. 8-10 of Exhibits.

Exhibit C, Colostomy Friends of the Philippines, http://colostomyfriends.blogspot.com/2010/10/cleaning-ostomy-bags-for-reuse-again.html, Oct. 26, 2010, pp. 11-13 of Exhibits.

Exhibit D, Chron's Forum, http://www.crohnsforum.com/showthread.php?t=29416, Dec. 3, 2011, pp. 14-22 of Exhibits.

Exhibit E, Compost, http://en.wikipedia.org/wiki/Compost, page last modified Jan. 25, 2012, pp. 23-32 of Exhibits.

Exhibit F, BioBag and the Environment, http://www.biobagusa.com/mater_bi.htm, 2007, pp. 33-35 of Exhibits.

Exhibit G, EcoFilm® Patented Biodegradable Film, http://www.ecofilm.com/files/pds/Eco%20Film%20 Biodegradable.pdf, Jan. 7, 2009, pp. 36-37 of Exhibits.

Exhibit H, FAQ's, http://www.bioplastics.bastcom/faq.html, printed from internet on Jan. 30, 2012, pp. 37-40 of Exhibits.

Exhibit I, Bioplastic, http://en.wikipedia.org/wiki/Bioplastic, page last modified Jan. 30, 2012, pp. 41-50 of Exhibits.

Polyethylene—Wikipedia, the free encyclopedia—http://en.wikipedia.org/wiki/Polyethylene. Dated Nov. 7, 2011.

CareBayer "How often to change colostomy bags?" -http://allnurses.com/wound-ostomy-continence/how-often change-288286.html. Dated Mar. 12, 2008.

JPO Office Action —Notice of Rejection for Japanese Application No. 2009-500555 based on PCT/US2007/063496; Dated Feb. 8, 2012.

* cited by examiner

DIAPER RASH PREVENTION APPARATUS

FIELD AND BACKGROUND OF THE INVENTION

The present invention relates to sanitary apparatuses, and more particularly, to sanitary apparatuses adapted for managing fecal matter.

SUMMARY

An apparatus is provided that includes an enclosure with an aperture which is adapted for being placed in communication with an anus for the purpose of directing fecal matter into the enclosure. In one embodiment, the enclosure may include a polyethylene material with a thickness of less than 50 microns. In another embodiment, the enclosure may include an air hole formed therein for remaining open to allow air to escape therefrom upon the receipt of the fecal matter into the enclosure. In still yet another embodiment, the aperture may be circular and the enclosure may include a flexibility sufficient to allow rotation of the enclosure about an axis defined by the aperture.

DETAILED DESCRIPTION

Figure 1A:
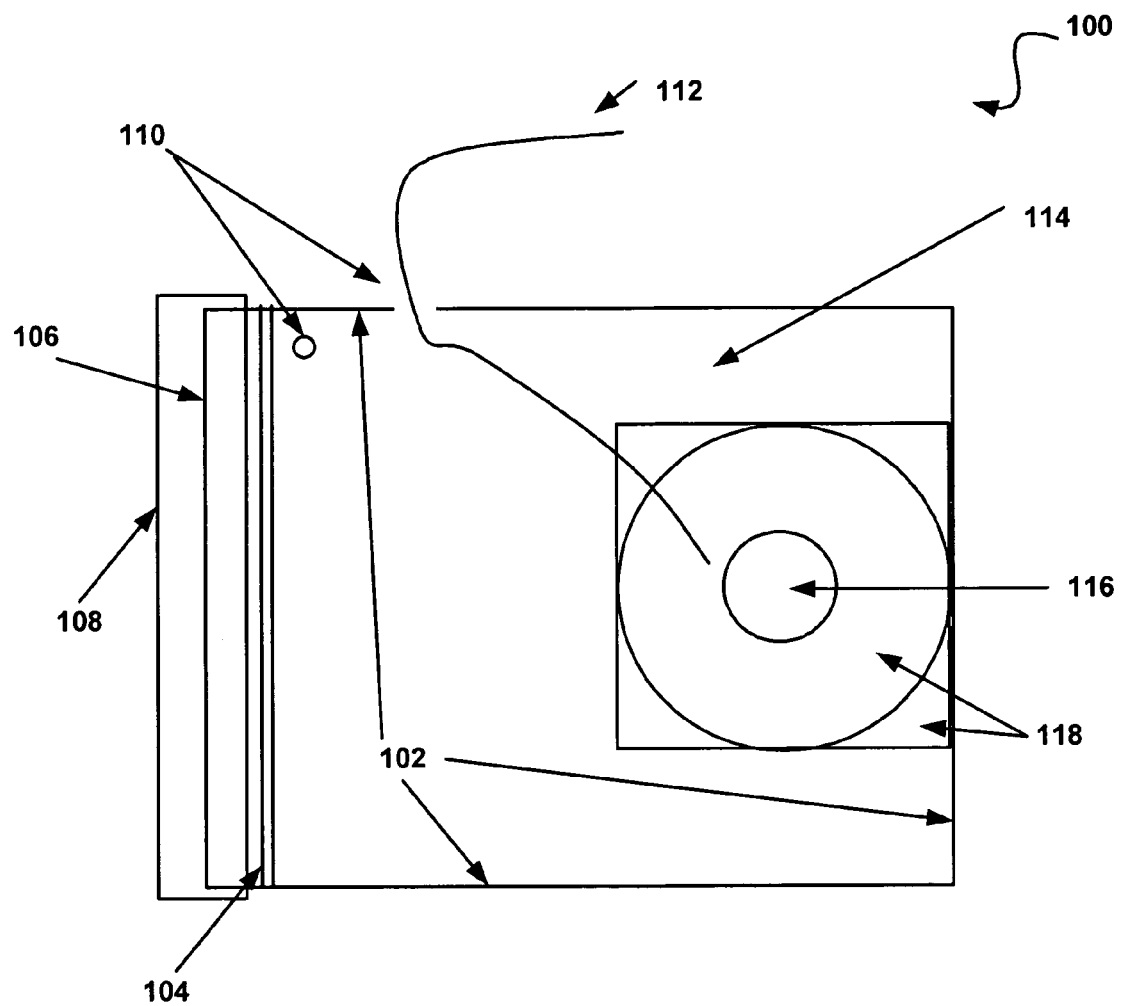
FIGS. 1a-1c illustrate a top view of an enclosure that prevents diaper rash, in accordance with various of embodiments.

FIG. 1a illustrates a top view of an enclosure 100 that prevents diaper rash, in accordance with one of the embodiments. The enclosure 100 may comprise, for example, a thin, rectangular, flexible, waterproof container. Of course, such enclosure 100 may be in the form of other shapes, such as circular, polygonal, oval, etc. As an option, the enclosure 100 may be a bag. Furthermore, the enclosure may be constructed utilizing an air-impermeable material. FIG. 1a specifically shows the top view of the enclosure 100 as it appears prior to placement on an intended wearer.

The enclosure 100 may consist of two thin sheets 114 of a waterproof material, such as, for example, a low density or high density polyethylene material (e.g. plastic). In use, the two thin sheets 114 may be sealed to each other in a planar fashion along at least three edges 102 of the enclosure 100. For instance, the two thin sheets 114 may be sealed together by heat sealing. As shown in FIG. 1a, a fourth edge 106 may remain unsealed prior to placement on the intended wearer, but may be sealed at some point after placement on the intended wearer. This may allow for the hand of the individual placing the enclosure 100 on the intended wearer to be inserted into the enclosure 100 for ease of placement. For shapes other than rectangular, this fourth edge may optionally be a length along the edge of the enclosure large enough to insert an adult human hand (e.g., a five inch length along the circumference of a circular enclosure).

The dimensions of the enclosure 100 may be approximately 5"×7" for infants, but may also be of various sizes depending on the age, weight, and gender of the intended wearer. Further, with respect to FIG. 1a, the unsealed fourth edge 106, may be placed along one of the 5 inch sides of the enclosure 100. In use, the 7 inch dimension provides enough volume inside the enclosure 100 to hold the solid waste produced by a single bowel movement of an infant less than one year old. Of course, dimensions larger than 7 inches are contemplated for older infants, toddlers and adults.

Additionally, in various embodiments, the thickness of the sheet comprising the walls of the enclosure 100 may be approximately 0.6 mils (i.e. 15 microns), but may also be substantially thinner or thicker (e.g. 10, 20, 25, 30 microns, etc.) depending on the age, weight, or gender of the intended wearer while still remaining sufficiently flexible, comfortable, and waterproof. Specifically, as the thickness of the bag exceeds 1.25 mils (i.e. approximately 31 microns), the bag may become less flexible such that it does not always conform well to the perianal area of the intended wearer, thereby causing the enclosure 100 to perform less reliably.

The enclosure 100 may also include an aperture 116. For example, the aperture 116 may be approximately 1-2 inches in diameter (e.g. 1 inch diameter for infants less than one year old). As shown in FIG. 1a, the aperture 116 may be located on the top sheet of the enclosure 100, such that the aperture 116 may be in communication with an anus of the intended wearer for the purpose of directing fecal matter into the enclosure 100. In particular, the aperture 116 may be centered along the midline of the narrower dimension of the enclosure 100 (e.g. the 5 inch side of the 5"×7" enclosure 100) and may be approximately 1.0-1.5 inches plus the aperture 116 radius from the sealed edge opposite the open edge of the enclosure 100.

In addition, FIG. 1a shows an area of adhesive 118 attached to a top sheet of the enclosure 100 surrounding the aperture 116. The adhesive 118 may be flexible waterproof pressure sensitive adhesive which is acceptable for medical/surgical applications or for use in contact with human skin for several hours at a time. The area of adhesive 118 may be any shape, such as circular or rectangular (as will be described in further detail with respect to FIG. 3), such that there is approximately one inch of adhesive 118 surrounding the perimeter of the aperture 116 of the enclosure 100. Of course, there may be more or less adhesive 118 surrounding the perimeter of the aperture 116 depending on the strength of the adhesive material utilized.

In some embodiments, the adhesive 118 may be double sided in order to adhere to the surface of the enclosure 100 and to the perianal area of the intended wearer when the aperture 116 is centered over the anal opening of the intended wearer. An example of adhesive material that may be utilized is 3M 1524 Medical Transfer Adhesive, which is a fiber-reinforced, hypoallergenic, pressure sensitive adhesive that is 2.5 mils thick with a 40 oz/in. adhesion to steel.

Thus, the enclosure 100 of FIG. 1a, as described above, is capable of eliminating the need for a flange surrounding the aperture 116 of the enclosure 100, where such flange would be used to form a reliable seal between the enclosure 100 and the perianal area of the intended wearer. As shown in FIG. 1a, the flange is unnecessary due to the inherent flexibility of a very thin enclosure 100 and very thin flexible adhesive 118 on the outer surface of the enclosure 100 surrounding the aperture 116. This combination forms a water tight seal over the area covered by the adhesive 118.

In use, the enclosure 100 is placed on the intended wearer so that the aperture 116 of the enclosure 100 is centered over the anal opening of the intended wearer. The adhesive area 118 surrounding the aperture 116 of the enclosure 100 may be pressed against the skin surrounding the anal opening of the intended wearer. In addition, the aperture 116 of the enclosure 100 may be circular and the adhesive area 118 may also be circular, or any other shape as long as it is sufficiently large (e.g. extending approximately one inch from the edge of the aperture 116 outward around the perimeter of the aperture 116). Thus, due at least in part to its flexibility (as described herein), the enclosure 100 may be placed on the wearer in any orientation (e.g. rotational, etc.) about an axis whose origin passes through the center of the aperture 116 in the enclosure 100 and is perpendicular to the plane of the aperture 116. In this way, it is not necessary to align the aperture 116 with any particular axis of the enclosure 100 in order for it to properly adhere to the intended wearer.

Figure 4:
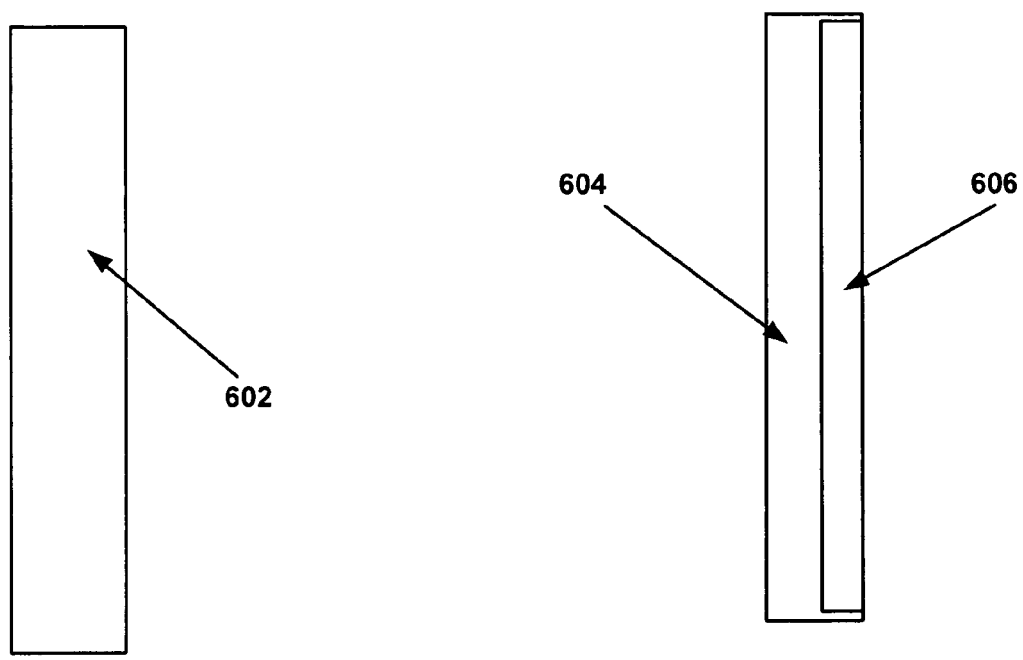
FIG. 4 shows single-sided adhesive material and a release liner at an open end of the enclosure, in accordance with still yet another embodiment.

Shown in FIG. 1a is a single-sided adhesive 108, such as pressure sensitive 3M #1515, Nonwoven Medical Tape, for example, that is attached to the enclosure 100 on a one-half inch wide strip along the unsealed edge 106. Of course, the single sided adhesive 108 may be of any sufficient width. The single-sided adhesive 108 may extend beyond the edge of the enclosure 100 another one-half inch, or any sufficient amount, as shown. A release liner, such as that which will be described in more detail with respect to FIG. 4, is placed on the extended exposed portion of the adhesive coated area 108 not attached to enclosure 100 and may be removed before placement on the wearer or afterwards depending on whether a hand is placed inside the enclosure 100 during placement. In either case, the exposed adhesive coated area 108 is folded over to seal the open end of the enclosure 100.

Once the enclosure 100 is placed on the intended wearer, the only opening remaining in the enclosure 100 that is exposed to the outside environment is at least one small hole 110, such as pinholes, that are approximately 40-50 mils in diameter (i.e. 1-1.25 mm in diameter) and that allow for the escape of gas or air trapped in the enclosure 100. This hole 110 is placed as far from the aperture 116 over the anal opening as possible to minimize any leaking of solid waste through it. For example, the hole 110 may be located on an end of the enclosure 100 that is opposite to the end of the enclosure 100 proximal to the aperture 116. The at least one hole 110 may be placed along an edge of the enclosure 100 or on the face of one of the sheets comprising the enclosure 100. Although leakage may rarely occur through the hole 110, it is minimal in nature. However, the hole 110 prevents the enclosure 100 from being placed under excessive pressure from trapped air or gas while the wearer is in a sitting position which may cause the enclosure 100 to burst.

Once solid waste enters the enclosure 100, the entire enclosure 100 is removed from the wearer by placing the wearer on his/her back, spreading the legs apart, and removing the enclosure 100 by grasping the top end and removing in a downward motion so that the aperture 116 over the anal opening is facing upward after removal. This minimizes the chances of spilling any of the contents of the enclosure 100.

The adhesive coated area 118 surrounding the aperture 116 of the enclosure 100 may then be covered with material which is similar in size to the release liner over the aperture 116 of the enclosure 100, to completely seal the enclosure 100 before disposal. The material may include water proof tape, such as 3M 3650 series storage tape or even a thin plastic sheet such as saran wrap. The adhesive area 118 may be sufficiently intact that it will adhere to any clean, dry material or surface to seal the aperture 116 sufficiently for disposal. The release liner, such as that which will be described with respect to FIG. 2, which covers the aperture 116 of the enclosure 100 and which is removed prior to placing the enclosure 100 on the intended wearer, may also be used for this purpose.

Additional optional enhancements may also be provided in the context of the enclosure 100 of FIG. 1a, including: 1) medication, chemicals and/or perfumes placed inside the enclosure 100 to chemically react with the solid waste to at least further reduce or eliminate odor, 2) a bio-degradable enclosure 100 such as those produced from corn sugars by NatureWorks, a subsidiary of Cargill, that would be environmentally disposable and/or could be safely placed into and flushed in a toilet for disposal, 3) a string or strip 112 whose one end is inside the enclosure 100 and whose other end exits through a small opening in the enclosure 100 (e.g. the air hole 110) that changes color or appearance to indicate that the enclosure has been filled with solid waste, such as a strip of litmus material, and/or 4) a re-sealable labyrinth seal 104 located along the edge of the enclosure 100 that is initially unsealed 106 and which is sealed before or after placing the enclosure 100 on the intended wearer, which would eliminate the need for an adhesive seal along that edge 106.

Figure 1B:
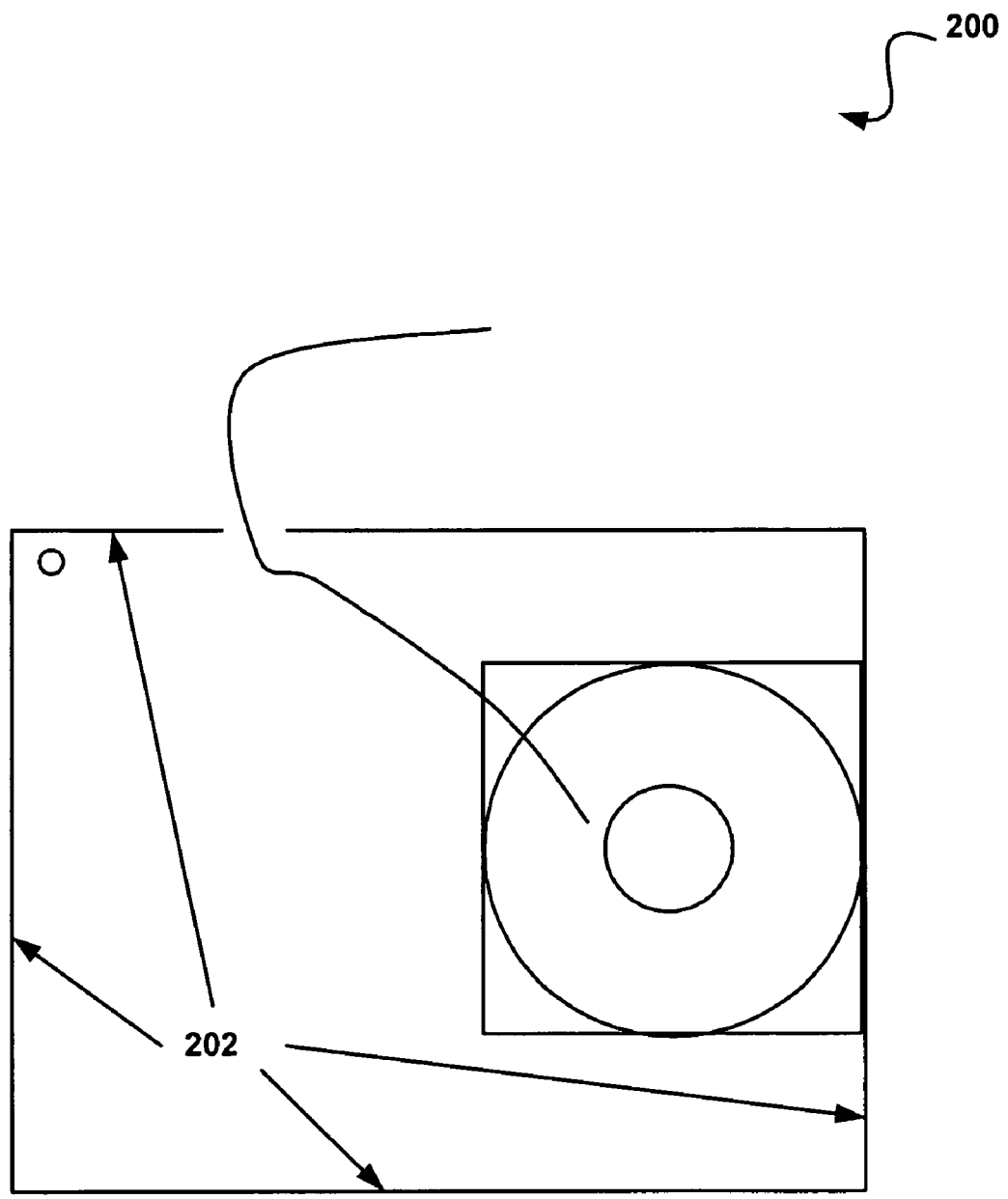

FIG. 1b illustrates a top view of an enclosure 200 that prevents diaper rash, in accordance with another of embodiment. As an option, the present enclosure 200 may be constructed in the context of the enclosure of FIG. 1a. Of course, however, the enclosure 200 may be constructed in any desired manner. Further, the aforementioned definitions may equally apply to the description below. Specifically, FIG. 1b shows an enclosure 200 in which all four edges 202 are initially sealed.

Figure 1C:
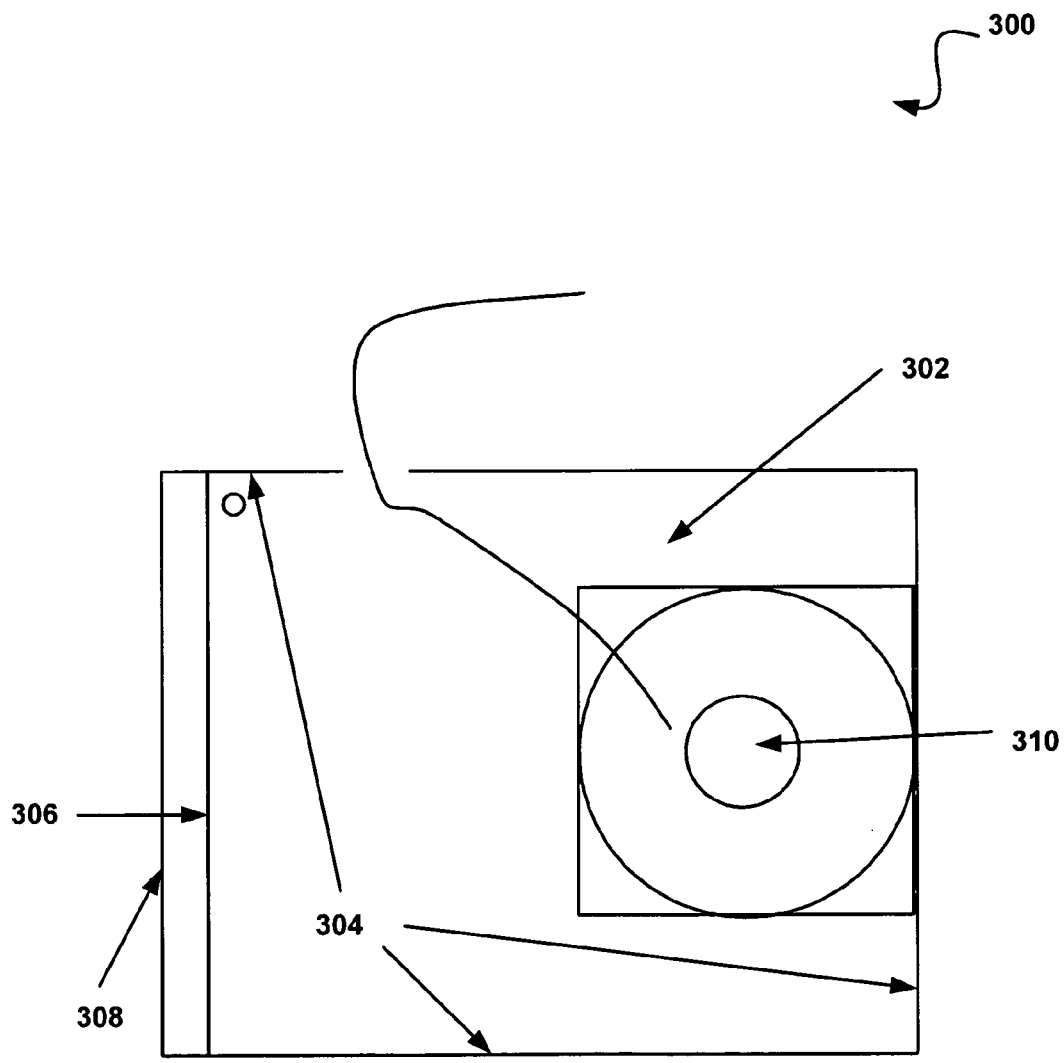

FIG. 1c illustrates a top view of an enclosure 300 that prevents diaper rash, in accordance with yet another embodiment. As an option, the present enclosure 300 may be constructed in the context of the enclosure of FIG. 1a. Of course, however, the enclosure 300 may be constructed in any desired manner. Further, the aforementioned definitions may equally apply to the description below. Specifically, FIG. 1c shows an enclosure 300 which consists of three sheets 302, where the sheet layer facing the wearer and the middle sheet layer are sealed to each other on all four edges 304 and 306 while the third sheet layer is sealed to the other two sheet layers along three of the edges 304 with the fourth edge left unsealed 308. Although it is shown in FIG. 1c that the fourth edge left unsealed 308 of the third sheet layer extends to the left beyond the sealed edge 306 of the wearer facing layer sheet and the middle layer sheet, it may also be coincident with sealed edge 306 or to the right of the sealed edge 306 without affecting its purpose and may be chosen on the basis of ease of manufacture.

Figure 2:
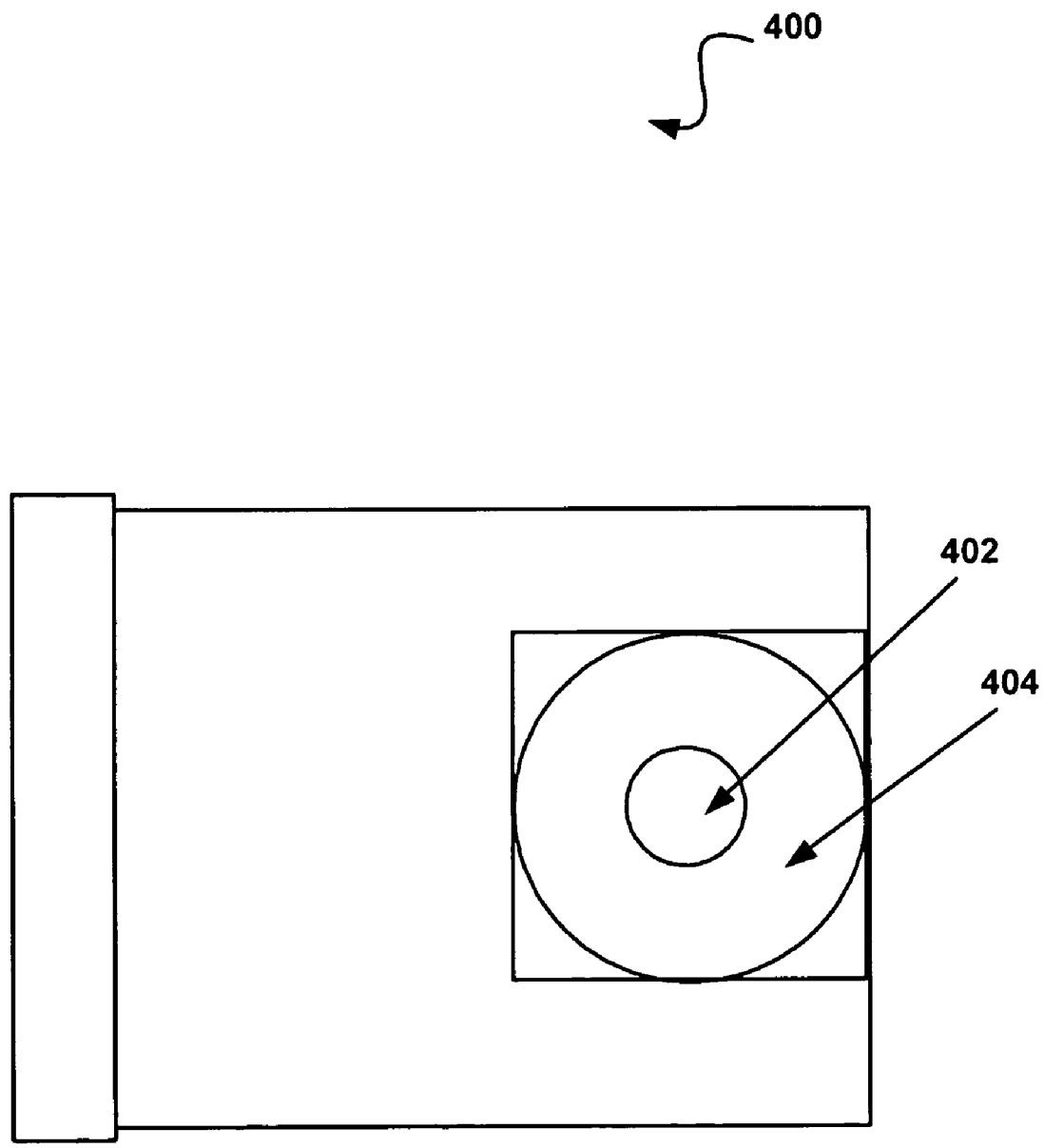
FIG. 2 shows a top view of an enclosure that prevents diaper rash which includes a release liner over an adhesive coated area, in accordance with another embodiment.

FIG. 2 shows a top view of an enclosure 400 that prevents diaper rash which includes a release liner 404 over an adhesive coated area, in accordance with another embodiment. As an option, the present enclosure 400 may be constructed in the context of the enclosure' of FIGS. 1a-1c. Of course, however, the enclosure 400 may be constructed in any desired manner. Further, the aforementioned definitions may equally apply to the description below.

With respect to FIG. 2, the side of the adhesive area facing the intended wearer, such as that described in FIG. 1a, may be initially covered by a release liner 404 that covers at least all of the adhesive coated area. An example of such a release liner 404 is 3M 1361 Release Liner (60 lb., semi-bleached Kraft paper, silicone release coated, 3.5 mils thick). The release liner 404 may be kept in place prior to placement on the intended wearer to prevent deterioration of the adhesive before use. The release liner 404 may be removed just prior to placement of the enclosure 400 on the intended wearer. Once the release liner 404 is removed from the adhesive coated area, the side of the enclosure 400 with the aperture 402 may be pressed against the skin of the intended wearer around the anal opening such that the aperture 402 of the enclosure 400 is centered over the anal opening of the intended wearer.

The adhesive coated area serves to isolate the area of skin immediately surrounding the anal opening from the skin outside this adhesive area. Once solid waste exits the anal opening, it will enter the enclosure 400 through the aperture 402. Due to the waterproof property of the enclosure 400 and the seal created by the area of adhesive in contact with the skin, solid waste will not be allowed to come into contact with urine that may be present outside of the enclosure 400. In addition, any urine on the skin outside the adhesive contact area will be prevented from coming into contact with any skin in the adhesive contact area or inside the adhesive contact area by the waterproof nature of the adhesive contact seal and the enclosure 400.

It is important to note that the area of skin that the enclosure 400 will be in contact with is the skin surrounding the anal opening but not the skin at or inside the anal opening. Since the skin surrounding the anal opening (i.e. the perianal area) does not stretch or contract as solid waste passes by it, there is no requirement that the material comprising the enclosure 400 or the adhesive coated area, such as that described in FIG. 1a, be of equal or greater elasticity than the skin at the anal opening.

Another advantage of the enclosure 400 is that it does not require a separate applicator in order to place the enclosure 400 on the intended wearer. As in FIG. 1a, the person placing the enclosure 100 on the intended wearer can place one hand inside the enclosure 100 through the unsealed edge 106. As in FIG. 1b, the person placing the enclosure 200 on the intended wearer can place one hand behind the enclosure 200 with the end of the middle finger approximately centered over the aperture and can hold onto the enclosure 100 by wrapping the outer edges around the second and fourth fingers while pressing against them with the small finger and thumb respectively. As in FIG. 1c, the person placing the enclosure 300 on the intended wearer can hold onto the enclosure 300 by simply placing one hand between the third sheet with one unsealed edge 308 and the middle sheet. In this way, the enclosure 300 allows for a pocket located on a side opposite and/or proximal to the aperture 310 to receive the hand of the person placing the enclosure 300 on the intended wearer. In all cases, once the enclosure 400 is held in place by one hand, the release liner 404 may be removed from the area of adhesive surrounding the aperture 402 in the enclosure 400.

Figure 3:
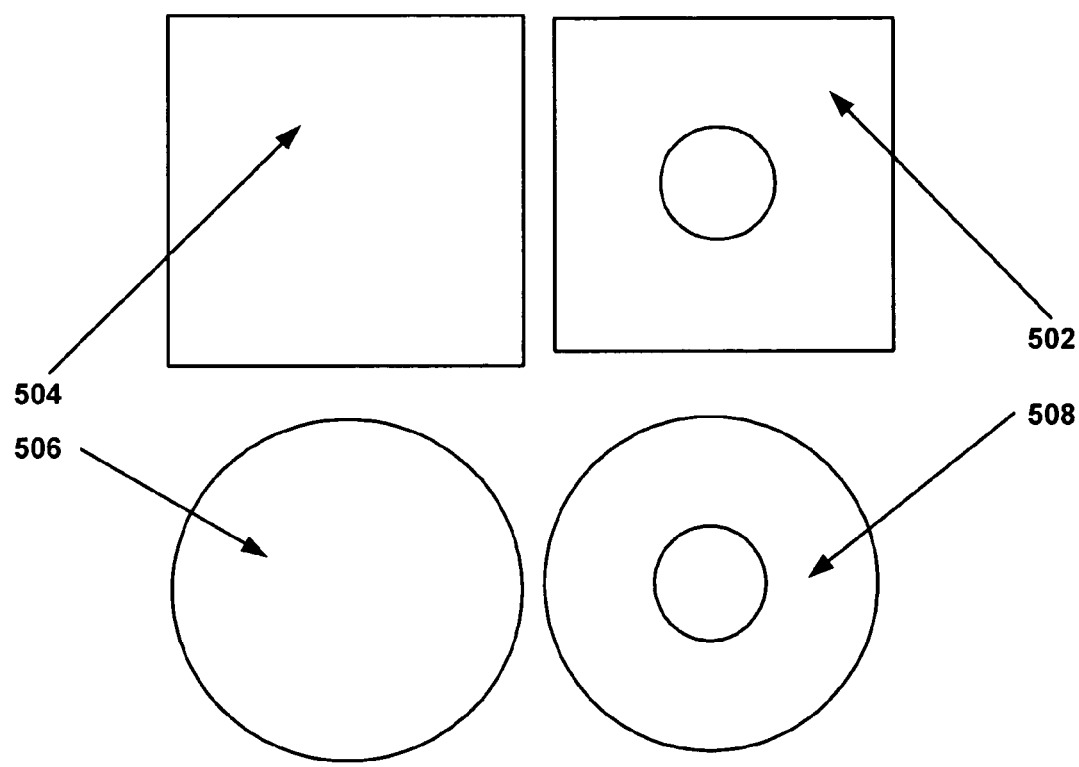
FIG. 3 shows double-sided adhesive areas and release liners surrounding an aperture of the enclosure, in accordance with yet another embodiment.

FIG. 3 shows double-sided adhesive areas 502 and 508 and release liners 504 and 506 surrounding an aperture of the enclosure, in accordance with yet another embodiment. As an option, the present adhesive coated areas 502 and 508 and release liners 504 and 506 may be utilized with the enclosures of FIGS. 1a-1c and 2. Of course, however, the adhesive coated areas 502 and 508 and release liners 504 and 506 may be utilized in any desired manner.

Specifically, the double-sided adhesive areas 502 and 508 and the release liners 504 and 506 may be constructed in rectangular or circular shapes. As shown, the rectangular double-sided adhesive 502 may have one side in contact with an enclosure, such as that described with respect to FIG. 1a, and the other side in contact with a rectangular release liner 504. Alternatively, the circular double-sided adhesive 508 may have one side in contact with an enclosure, such as that described with respect to FIG. 1a, and the other side in contact with a circular release liner 506.

FIG. 4 shows single-sided adhesive material 604 and 606 and a release liner 602 at an open end of the enclosure, in accordance with still yet another embodiment. As an option, the present adhesive material 604 and 606 and a release liner 602 may be utilized with the enclosures of FIGS. 1a-1c and/or 2. Of course, however, the adhesive material 604 and 606 and a release liner 602 may be utilized in any desired manner.

As shown, a first area of the single-sided adhesive material 606 adheres to the underside of the enclosure, with placement such as that shown in item 108 of FIG. 1a. The second area of the single-sided adhesive material 604 adheres to the release liner 602 such that any adhesive material 604 that extends beyond the enclosure is protected by the release liner 602.

The enclosures described with respect to FIGS. 1a-1c are equally usable by males or females. The described enclosures may be utilized for the prevention of rashes in infants and toddlers, and may also be utilized by adults, such as elderly adults in nursing homes who may have become incontinent. The dimensions of the enclosure and the aperture surrounding the anal opening may be different according to the type of the intended wearer.

The enclosures described with respect to FIGS. 1a-1c also reduce the time, effort, untidiness, and odor associated with the changing of soiled diapers. They dramatically improve the hygiene of the soiled diaper changing process for both the intended wearer and the individual changing the enclosure. These are separate advantages of using the proposed enclosure as compared with using conventional disposable diapers alone, and are independent of its utility as a means for preventing diaper rash.

In addition, the enclosures described with respect to FIGS. 1a-1c allows conventional disposable diapers to be worn longer since one of the important reasons for changing soiled diapers immediately is the prevention of diaper rash. If a disposable diaper utilizing the enclosure is dry but the proposed enclosure itself contains solid waste, the enclosure can be removed as described above and the disposable diaper can be reinstalled.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. An apparatus, comprising:
a single layer enclosure with a flangeless aperture adapted for being placed in communication with an anus for the purpose of directing fecal matter into the single layer enclosure, wherein the single layer enclosure includes a pocket formed on the single layer enclosure on a first side opposite a second side in which the flangeless aperture is formed and where the pocket is attached to the single layer enclosure along at least two edges of the pocket such that the pocket is on an opposite side of the enclosure from a side facing a wearer and therefore the enclosure is between the pocket and the wearer;
wherein an adhesive is formed about the flangeless aperture in a manner configured to maintain a portion of the material of the enclosure in contact with the skin of a wearer such that the flangeless aperture is maintained in communication with the anus;
wherein a cover is releasably coupled over at least one of the flangeless aperture and the adhesive;
wherein the single layer enclosure is constructed utilizing an air-impermeable or water-impermeable material;
wherein the adhesive includes a transfer adhesive.

2. The apparatus of claim 1, wherein the single layer enclosure comprises a pair of substantially planar sheets each with edges that are integrally coupled.

3. The apparatus of claim 1, wherein the single layer enclosure includes an opening formed thereon by an unsealed portion along an edge of the single layer enclosure for receiving a hand of a user.

4. The apparatus of claim 3, wherein the single layer enclosure includes the adhesive for selectively sealing the opening.

5. The apparatus of claim 1, wherein a substance is included inside the single layer enclosure, the substance selected from the group consisting of a medication, a chemical, and a perfume.

6. The apparatus of claim 1, wherein the adhesive includes a double-sided adhesive.

7. The apparatus of claim 1, wherein the single layer enclosure is constructed utilizing at least one of a translucent or a transparent material.

8. The apparatus of claim 1, wherein at least one air hole is formed in the single layer enclosure for remaining open to allow air to escape therefrom upon receipt of the fecal matter into the single layer enclosure.

9. The apparatus of claim 8, wherein a piece of material passes through the air hole in the single layer enclosure for indicating whether the fecal matter has been received into the single layer enclosure.

10. The apparatus of claim 1, wherein the flangeless aperture is circular and the single layer enclosure includes a flexibility sufficient to allow the single layer enclosure to be placed on an intended wearer in any orientation about an axis defined by the flangeless aperture.

11. An apparatus, comprising:
a single layer enclosure with a flangeless aperture adapted for being placed in communication with an anus for the purpose of directing fecal matter into the single layer enclosure, wherein the single layer enclosure includes a pocket formed on the single layer enclosure on a first side opposite a second side in which the flangeless aperture is formed and where the pocket is attached to the single layer enclosure along at least two edges of the pocket such that the pocket is on an opposite side of the enclosure from a side facing a wearer and therefore the enclosure is between the pocket and the wearer;
wherein an adhesive is formed about the flangeless aperture for maintaining the flangeless aperture in communication with the anus.

12. The apparatus of claim 11, wherein the single layer enclosure comprises a polyethylene material or a biodegradable plastic material with a thickness of less than 50 microns.

13. The apparatus of claim 12 wherein the adhesive is formed about the flangeless aperture in a manner configured to maintain a portion of the material of the enclosure in contact with the skin of a wearer such that the flangeless aperture is maintained in communication with the anus.

14. The apparatus of claim 11 wherein the single layer enclosure is constructed utilizing an air-impermeable or water-impermeable material.

15. The apparatus of claim 11 wherein a cover is releasably coupled over at least one of the flangeless aperture or the adhesive.

16. The apparatus of claim 11, wherein at least one air hole is formed in the single layer enclosure and configured to remain open to allow air to escape therefrom upon receipt of the fecal matter into the single layer enclosure.

17. The apparatus of claim 11, wherein the adhesive is a transfer adhesive or a double-sided adhesive.

18. An apparatus, comprising:
a single layer enclosure with a flangeless aperture adapted for being placed in communication with an anus for the purpose of directing fecal matter into the single layer enclosure;
wherein the single layer enclosure comprises a plastic material;
wherein an adhesive is formed about the flangeless aperture in a manner configured to maintain a portion of the material of the enclosure in contact with the skin of a wearer such that the flangeless aperture is maintained in communication with the anus;
wherein a cover is releasably coupled over at least one of the flangeless aperture or the adhesive;
wherein the single layer enclosure is constructed utilizing an air-impermeable or water-impermeable material;
wherein the single layer enclosure includes a pocket formed on the single layer enclosure on a first side opposite a second side in which the flangeless aperture is formed and where the pocket is attached to the single layer enclosure along at least two edges of the pocket such that the pocket is on an opposite side of the enclosure from a side facing a wearer, whereby the enclosure is between the pocket and the wearer.

19. The apparatus of claim 18, wherein a substance is included inside the single layer enclosure, the substance selected from the group consisting of a medication, a chemical, and a perfume.

20. The apparatus of claim 18, wherein the adhesive is a transfer adhesive or a double-sided adhesive.

21. The apparatus of claim 18, wherein the single layer enclosure is constructed utilizing at least one of a translucent or a transparent material.

22. The apparatus of claim 18, wherein at least one air hole is formed in the single layer enclosure for remaining open to allow air to escape therefrom upon receipt of the fecal matter into the single layer enclosure.

23. The apparatus of claim 18, wherein a piece of material passes through the air hole in the single layer enclosure for indicating whether the fecal matter has been received into the single layer enclosure.

24. The apparatus of claim 18, wherein the flangeless aperture is circular and the single layer enclosure includes a flexibility sufficient to allow the single layer enclosure to be placed on an intended wearer in any orientation about an axis defined by the flangeless aperture.

* * * * *